J. H. FOX.
EDUCATIONAL DEVICE.
APPLICATION FILED OCT. 14, 1912.
1,136,663.
Patented Apr. 20, 1915.
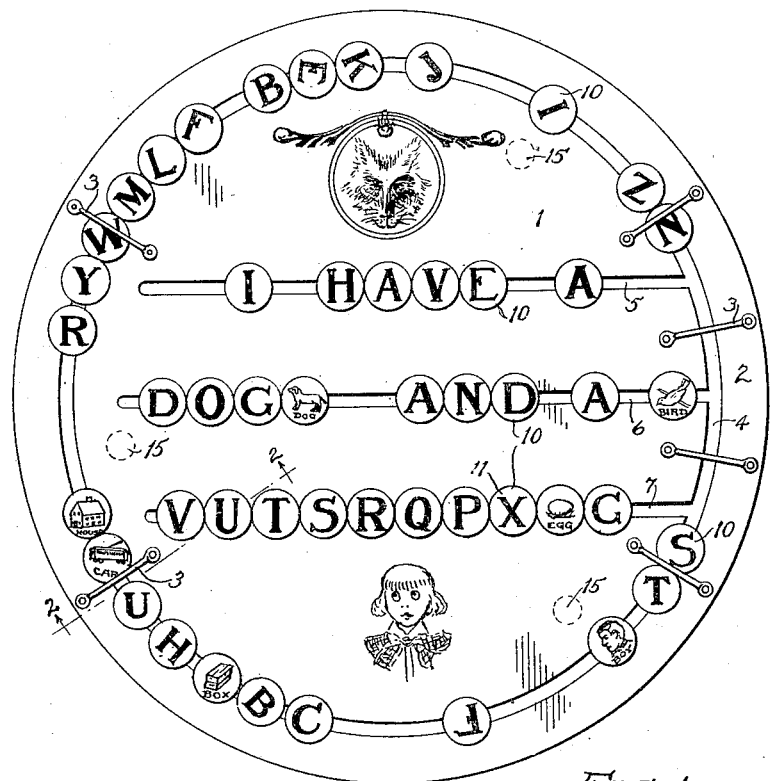
Fig.1.
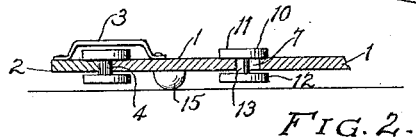
Fig.2.
  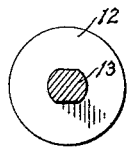 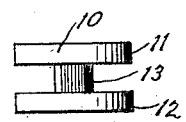
Fig.3.  Fig.4.  Fig.5.  Fig.6.
WITNESSES:
Justin L. Macklin
Brennen B. West
INVENTOR:
John H. Fox,
BY Albert H. Baker,
ATTY

UNITED STATES PATENT OFFICE.

JOHN H. FOX, OF BEREA, OHIO.

EDUCATIONAL DEVICE.

1,136,663.  Specification of Letters Patent.  Patented Apr. 20, 1915.

Application filed October 14, 1912. Serial No. 725,613.

*To all whom it may concern:*

Be it known that I, JOHN H. Fox, a citizen of the United States, residing at Berea, in the county of Cuyahoga and State of Ohio, have invented a certain new and useful Improvement in Educational Devices, of which the following is a full, clear, and exact description, reference being had to the accompanying drawings.

This invention relates to educational toys or devices wherein there is a holder carrying a series of movable buttons with letters, figures, etc., on them, which buttons are adapted to be shifted into various assortments, thereby assisting the child in learning to spell, as well as to provide entertainment.

In accomplishing the desired object, I prefer to provide a holder of suitable material in a sheet form having an annular passageway and various transverse passageways communicating therewith, and a series of double-headed buttons having round heads and having shanks so arranged that the buttons may occupy any position in the annular passageway, but, when assembled into the transverse passageways, may only stand with the characters upright. Thus, the child is provided with the entertaining exercise of turning the characters into proper position, as well as selecting the proper character. The invention is hereinafter more fully explained and its essential characteristics set out in the claim.

In the drawing, Figure 1 is a plan or face view of my educational device; Fig. 2 is a detail, being a cross section of a portion of the device, as indicated by the line 2—2 in Fig. 1; Fig. 3 is a top plan of one of the buttons; Fig. 4 a bottom plan of the same button; Fig. 5 is a cross section of one of the buttons, showing the shape of the shank; and Fig. 6 is an edge view of the button.

Referring to the parts by numerals, 1 indicates the central body portion and 2 the outer rim portion of my device. These parts are of suitable sheet material, as, for example, heavy paste-board, tar-board, wood, etc. The central portion and the rim are secured in proper relation to each other by suitable braces, indicated by 3. These braces are preferably metal straps bent into a U-shape, as shown in Fig. 2, and riveted at their ends to the respective parts of the body. The inner edge of the outer ring 2 is enough larger than the periphery of the inner member 1 so that there is an annular passageway 4 between the members. Communicating with this passageway 4 are a series of passageways in the central portion 1, three being shown designated 5, 6 and 7.

10 indicates double headed buttons, of which there are a series slidable in the annular passageway 4 and adapted to occupy any of the transverse passageways. Each of these buttons is provided with two circular heads 11 and 12 connected by a shank 13. The annular passageway 4 is wider than any of the passageways 5, 6 or 7 and the shank 13 is elongated, as illustrated in Figs. 2, 5 and 6, sufficiently so that the button can not turn around in the straight passageways but may turn around in the annular passageway. Accordingly, the characters imprinted on the heads, as, for example, letters of the alphabet, may stand in any position when the button is in the annular passageway but must be in an upright position when the buttons are in a transverse passageway, this upright positioning presenting the character properly or upside down. This possibility of the characters occupying any position in the annular or storage passageway but having a definite position in the transverse or assemblage passageways, which definite position must be selected before the buttons are moved into the transverse passageway, adds to the attractiveness and educational value of the device.

As explained, the buttons are double headed and characters are imprinted on the two faces of each button. Accordingly, with the comparatively small number of buttons provided, sufficient letters are available for spelling many words, and numerals and figures may also be given. I secure to one side of the body suitable feet to support the device, so that the buttons may be freely shifted when the device is lying down. These feet may be conveniently made of rubber. Three of them are shown in the drawing designated 15 and suitably secured to the body 1. When the device is resting on these feet, or is turned over and rests on the braces 3, it stands with the buttons out of contact with the supporting surface so that they may be freely shifted. It is to be understood that the braces 3 rise above the plane of the body portion sufficiently to allow the buttons to pass beneath or across the brace, as illustrated clearly in Fig. 2.

Referring particularly to the buttons, it should be noted that the elongation of the shanks 13 is provided by flattening the sides of a cylindrical shank. The cylindrical portion of a shank is of a diameter slightly less than the width of the passageway 4 so that the buttons may freely turn in this passageway the same as if they had perfectly round shanks. The width of the passageways 5, 6 or 7 is less than the diameter of the shank 13, but slightly greater than the distance between the flattened portions of the shank. This allows the buttons to slide freely but not turn in the transverse passageways. As stated, this simple feature adds greatly to the attractiveness of the device.

Having thus described my invention, what I claim is:

A double headed button for an educational device consisting of three integral parts, namely; two round heads and a connecting shank, the shank being a flattened cylinder, the cylindrical portion of which is of materially less diameter than the diameter of the heads, and characters on the two opposite faces of the button.

In testimony whereof, I hereunto affix my signature in the presence of two witnesses.

JOHN H. FOX.

Witnesses:
ALBERT H. BATES,
JUSTIN W. MACKLIN.

Copies of this patent may be obtained for five cents each, by addressing the "Commissioner of Patents, Washington, D. C."